Sept. 11, 1923.  H. STOEHRER ET AL  1,467,959
AMUSEMENT DEVICE
Filed March 27, 1920
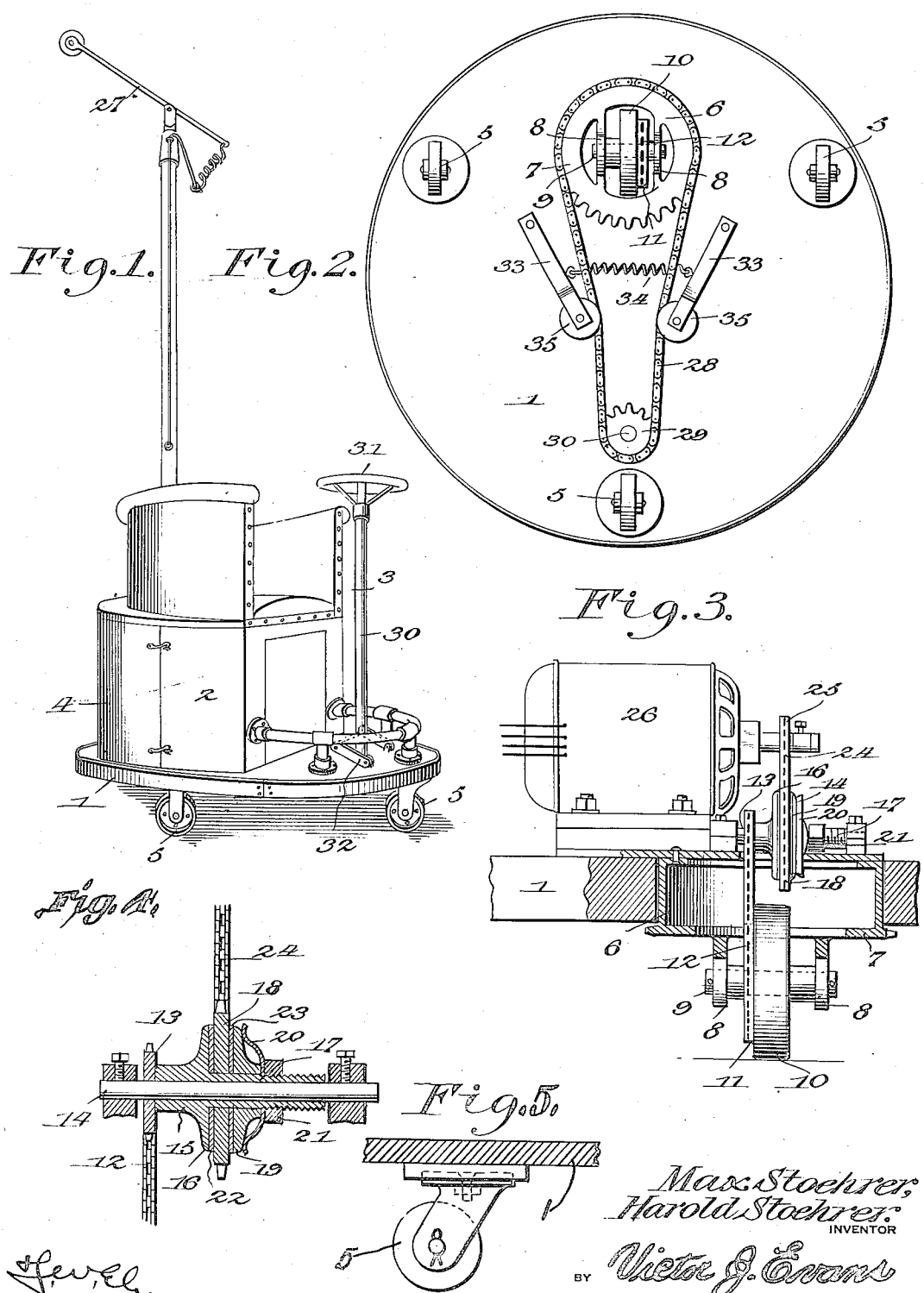

Patented Sept. 11, 1923.

1,467,959

UNITED STATES PATENT OFFICE.

HAROLD STOEHRER AND MAX STOEHRER, OF METHUEN, MASSACHUSETTS, ASSIGNORS TO STOEHRER & PRATT DODGEM CORPORATION, OF LAWRENCE, MASSACHUSETTS. A CORPORATION.

AMUSEMENT DEVICE.

Application filed March 27, 1920. Serial No. 369,381.

*To all whom it may concern:*

Be it known that we, HAROLD STOEHRER and MAX STOEHRER, citizens of the United States, respectively, residing at Methuen, respectively, in the county of Essex and State of Massachusetts, respectively, have invented new and useful Improvements in Amusement Devices, of which the following is a specification.

This invention relates to improvements in amusement devices and has for its special object the providing of an amusement device for parks and beaches and the like places by means of which device a person may be given a ride which ride shall be under control of the rider as to starting and stopping and as to direction in which the device is moved.

In the accompanying drawings consisting of 2 sheets;

Figure 1 is a perspective view of the entire device.

Figure 2 is a bottom view of the same.

Figure 3 is a detached view of the driving means and the mounting therefor, and

Figure 4 is a sectional detail view of the parts shown in Figure 3.

Figure 5 is a detail elevation, partly in section, illustrating one of the swiveled supporting rollers.

Like reference characters refer to like parts throughout the several views.

Referring more particularly to the drawings, 1, represents the base of the machine upon which is erected a body portion 2, surmounted by a seat 3. The body portion 2 is provided at its rear with a door 4, which may be opened or removed for the purpose of permitting access to the driving mechanism contained within said body portion under said seat.

Mounted to swivel on the bottom of the base 1 are three supporting casters 5, as will be clearly seen in Figure 2. Also mounted in the base 1 and adapted to rotate therein is a supporting member 6. Secured to the bottom of the supporting member 6 is a horizontally disposed sprocket wheel 7 having brackets 8 formed integrally therewith and extending downwardly therefrom, said brackets in their lower ends carrying a pivot rod 9 upon which is mounted a driving caster 10. Secured to the side of the driving caster 10 is a sprocket wheel 11 with which there meshes a sprocket chain 12 which chain passes upwardly through the base 1 and meshes with a sprocket 13 mounted on a counter shaft 14 as best seen in Figures 3 and 4. The sprocket 13 is secured to the end of the laterally extending member 15 having a flange 16 beyond which extends a tubular portion 17 surrounding said shaft 14. Mounted on the portion 17 is a sprocket wheel 18 and a washer 19 the latter being pressed toward said sprocket 18 by a spring 20 which is tensioned by a nut 21 screwed on the threaded ends of the portion 17 friction cloth is placed between the sprocket 18 and the flange 16 and the washer 19 as at 22 and 23. The sprocket 18 is connected by a chain 24 to a sprocket 25 secured to the shaft of the motor 26.

It will be obvious that when the motor is running motion will be transmitted to the chain 24 and sprocket 18 and through the friction clutch to the sprocket 13 and thence to the driving caster 10.

A trolley 27 is adapted to run upon a wire connected with some source of power and to conduct the power to said motor in a manner which is well understood.

Returning now to the sprocket 7 hereinbefore mentioned, a chain 28 connects the sprocket 7 with the sprocket 29 mounted at the forward part of the car on the lower end of the steering post 30 which steering post is provided at its upper end with a hand wheel or lever 31. It will be seen that by turning the handle or wheel 31 the sprockets 29 and 7 will be turned so as to change the position of the axis of the driving caster 10 and the car will then be driven in a corresponding direction.

32, Figure 1 represents a foot lever which is connected to a switch for turning the power on and off from said motor.

A take up device is provided for taking up the slack which may occur in the sprocket chain 28. This device is best seen in Figure 2 and consists substantially of a pair of rock arms 33 pivotally secured to the under side of the base 1 on the opposite sides of the chain 28 and connected by a spring 34. Each of these arms is provided with a roller 35 riding upon its respective side of the chain 28, the spring 34 tending constantly to draw the rock arms toward each other and thereby take up any slack in the chain 28.

Operation of various portions of the mechanism has been described hereinbefore but briefly stated the operation is as follows:—

The operator seats himself in the car and with his foot pushes down the foot lever which starts the motor into operation and thereby causes rotation of the driving caster to propel the car. Whenever it is desired to change the direction of driving the car the operator moves the hand wheel which as hereinbefore described causes a change in the direction of the axis of the driving caster and hence in the direction of the drive of the car.

It will now be observed that a distinctive feature of the invention, which adapts it particularly to the amusement art, is that of a motor driven car supported on unguided or swiveled casters 5 and a dirigible traction unit whose traction member engages the same platform or floor upon which the said supports or casters travel. The dirigible traction unit is perferably disposed eccentric to the central vertical axis of the car body and is shifted by the steering device. The result of this particular combination of elements is to provide a motor propelled car which in the hands of an unskilled person is more or less erratic or promiscuous in its direction of travel over the floor or platform. The attempt of the occupant to steer the car by shifting the position of the traction unit at once suddenly imposes a new line of movement upon the swiveled casters which, being unguided, will not readily adjust themselves quickly to a new straight line of movement and are very likely to assume slightly different angles with reference to each other, resulting in erratic or promiscuous movement of the car as the occupant attempts to guide it. This feature is one of the attractive amusement features of the device and is regarded as of practical importance in that connection.

While we have described what we deem to be the best embodiment of our invention it is obvious that minor particulars may be varied without in any way departing from the spirit of the invention; and we do not wish to be considered as limiting ourselves to the specific form of the embodiment here shown nor to anything else than the whole of our invention as herein described and as hereinafter more particularly pointed out in the appended claims.

And now having described our invention what we consider as new and desire to secure by Letters Patent is:—

1. An amusement device consisting of a car having uncontrolled traveling supports free to travel upon a floor in any direction, a motor driven traction unit carried by the car and having an element also adapted to travel upon the floor in any direction, means for causing a change in direction of movement of the car, and an overhead electrical trolley device carried by the car to supply current to the motor.

2. An amusement device consisting of a car having supporting means permitting the car to move upon a floor in any direction, a a motor driven traction unit carried by the car and having an element also adapted to travel upon the floor in any direction, means for causing a change in direction of movement of the car, and an overhead electrical trolley device carried by the car to supply current to the motor.

In testimony whereof we have affixed our signatures.

HAROLD STOEHRER.
MAX STOEHRER.